Dec. 25, 1945.    G. MARQUET    2,391,725
DEADCENTERLESS CRANK GEAR
Filed April 28, 1942    3 Sheets-Sheet 1

Inventor:
Georges Marquet

Inventor:
Georges Marquet

Dec. 25, 1945.     G. MARQUET     2,391,725
DEADCENTERLESS CRANK GEAR
Filed April 28, 1942     3 Sheets-Sheet 3

*Inventor:*
Georges Marquet

Patented Dec. 25, 1945

2,391,725

UNITED STATES PATENT OFFICE 2,391,725

DEAD-CENTERLESS CRANK GEAR

Georges Marquet, Lyon, France; vested in the Alien Property Custodian

Application April 28, 1942, Serial No. 440,865
In France November 12, 1941

9 Claims. (Cl. 74—36)

The present invention relates to crank gears of the kind adapted to be used on cycles, pedal machines, piston engines and like machines, and it has reference more particularly to improvements in the construction and operation of such gears.

The usual crank gears hitherto employed for these purposes are, generally, formed with two crank arms which are placed at 180° and fixed to the ends of a shaft common to both them. The said arms are acted upon by pedals or driving rods for converting reverse and uplift motion, or reciprocating rectilinear motion into rotatory motion of a driving wheel, or vice versa, which wheel is concentric with and fast on said shaft. Such crank gears are liable to the inconvenience of impeding the transmission of torques in the dead-center positions of the crank arms, because in these positions the power imparted for instance to the cranks by the pedals or driving rods is effective in a plane intersecting the axis of the crank shaft.

It is an object of the invention to introduce a more efficient method of converting reciprocating rectilinear motion into rotatory motion, and vice versa, by employing crank gears exempt from dead centers.

A further object is to provide a crank gear of this nature which will operate continually by producing torques that are effective throughout the entire crank path, and whereby transmission of power is rendered more uniform.

A still further object is to provide a crank gear of improved construction having relatively few and simple parts which are inexpensive to manufacture and install and which are durable, reliable and efficient in use.

With the aforesaid and other objects in view which will appear as the description proceeds, the invention comprises the combination of at least two separate coaxial cranks normally placed at 180° for alternately taking up a driving and a driven position upon rotation about the axis of the crank gear, said cranks being mounted for relative rocking movement about the said axis so as to be capable of turning at different speeds with respect to each other in the operative direction of rotation, and a rotatable driving organ eccentrically disposed with respect to the axis of the crank gear, said organ having an articulated driving connection with each of said cranks and being operative to alternately turn the inoperative crank past one dead-center position into a driving position before in the other dead-center position the operative crank changes from the driving state into the driven state.

In order that the said invention may be clearly understood and readily carried into effect, the same is described more fully with reference to the accompanying drawings which illustrate several embodiments by way of example.

In these drawings:

Fig. 3 is an axial sectional view through the parts shown in Fig. 4 on the section line S—S appearing therein, and Fig. 4 is a side elevation looking in from the right of Fig. 3, the crank arms for the sake of clearness being omitted.

Figure 5:
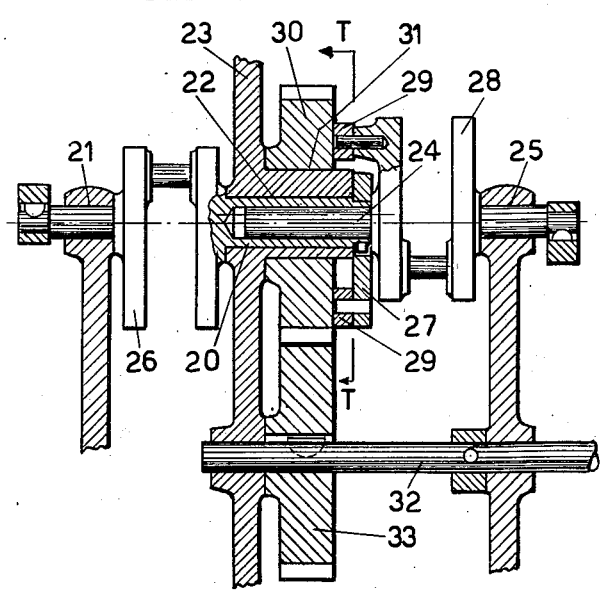
Figure 6:
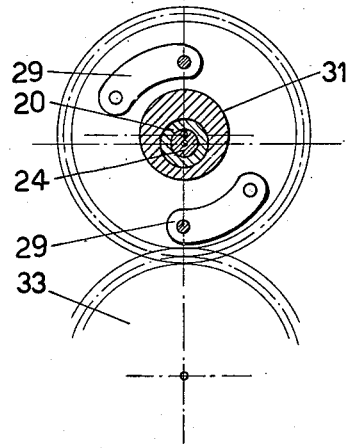
Figure 8:
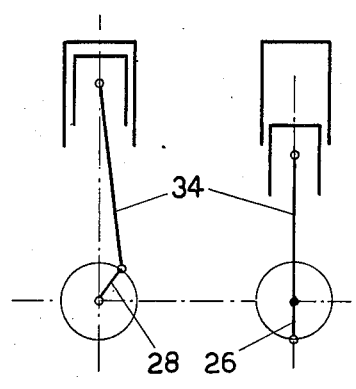
Figure 7:
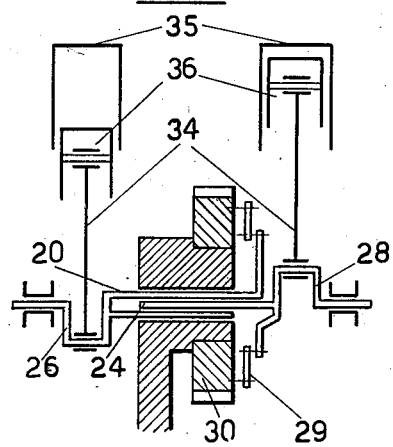

Figs. 5 to 8 show the second embodiment as applied to a double-throw piston engine. Fig. 5 is an axial section through the crank gear of said engine, and Fig. 6 is a cross section taken on the line T—T in Fig. 5. Figs. 7 and 8 illustrate, respectively, by a fragmentary axial sectional view and a side view the mode of operation of said crank gear.

Figure 10:
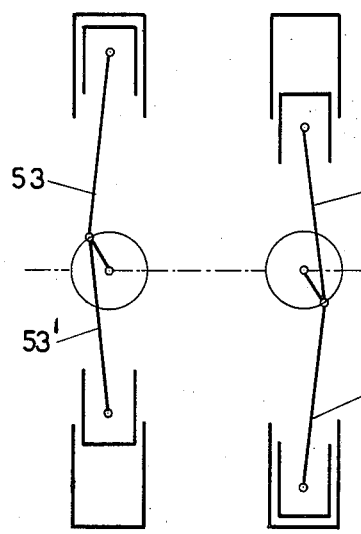
Figure 9:
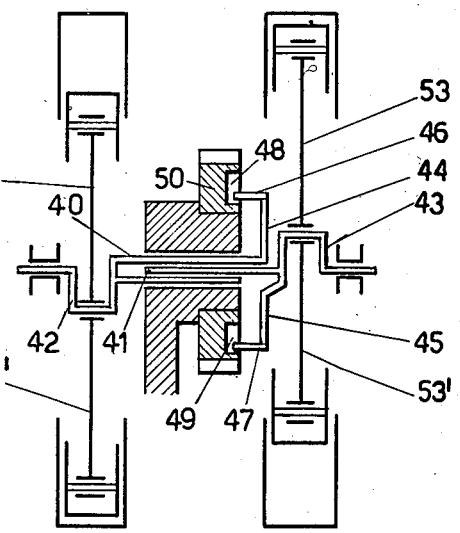

Figs. 9 and 10 are similar views showing the first embodiment of the invention as applied to a four-throw piston engine.

Figure 1A:
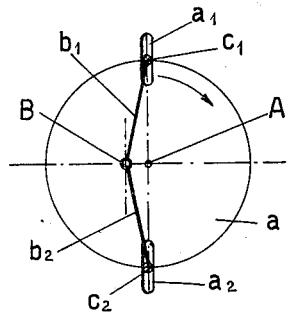
Figs. 1a to 1c are diagrammatic views showing a first embodiment of the invention in different working positions.
Figure 1B:
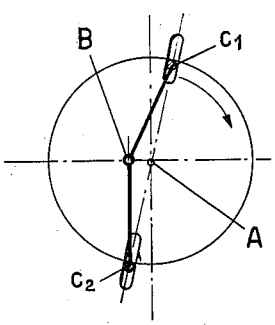
Figure 1C:
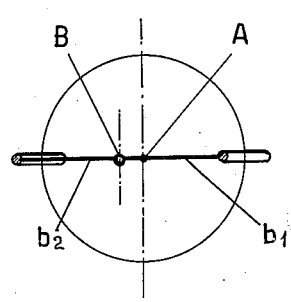

In the embodiment shown in Figs. 1a to 1c, a represents a driving wheel having its center at A and being eccentrically disposed with respect to the axis of a crank shaft B. The said wheel is shown provided with guide slots $a_1$ and $a_2$ engaging, respectively, pins $c_1$ and $c_2$ which are slidable in said slots and fixed to the ends of crank arms $b_1$ and $b_2$ mounted for relative rocking movement about the axis of the crank shaft B. Upon turning of the crank B, $b_1$, $b_2$, for instance in clockwise direction, the driving wheel a is set in rotation, whereby in the vertical position of the guide slots $a_1$, $a_2$, the crank arms $b_1$, $b_2$ branch at an acute angle from the axis of the shaft B (Fig. 1a), while in the horizontal position of the guides, said crank arms are brought into alignment with each other and coinciding with the center line A—B (Fig. 1c). It will be appreciated, therefore, that each complete revolution of the driving wheel a causes the crank arms to rotate with different speeds so as to enable the rising crank pin $c_1$ to move past the upper dead-center position before the descending crank pin $c_2$ reaches the lower dead-center position (Fig. 1b).

Figure 2A:
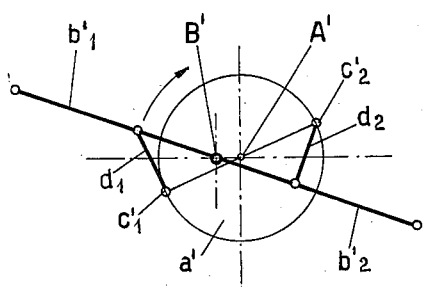
Figs. 2a to 2c are similar views showing a second embodiment of the invention in different working positions.
Figure 2B:
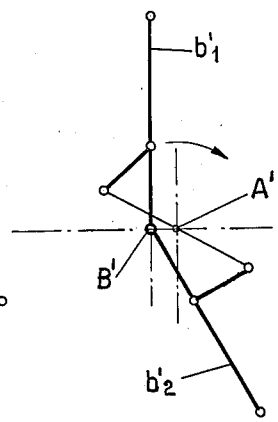
Figure 2C:
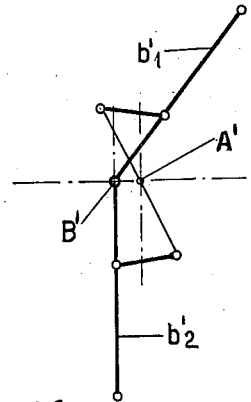

In the embodiment shown in Figs. 2a to 2c, the crank shaft B is shown carrying two crank arms $b_1'$ and $b_2'$ mounted for relative rocking movement about the axis of said shaft and coupled by means of links $d_1$ and $d_2$ to a driving wheel $a'$ having its center at A'. The operation of this crank gear is the same as has been described relative to Figs. 1a to 1c, with the difference however, that the aligned crank arms do not coincide with the center line A'B' but are set at the same angle therewith as the diameter of the wheel $a'$ connecting the pins $c_1'$ and $c_2'$.

Figure 3:
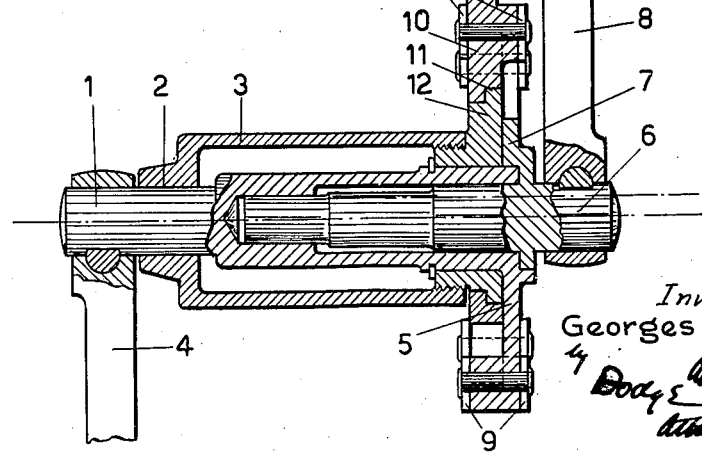
Figs. 3 and 4 show the second embodiment as applied to a cycle drive.
Figure 4:
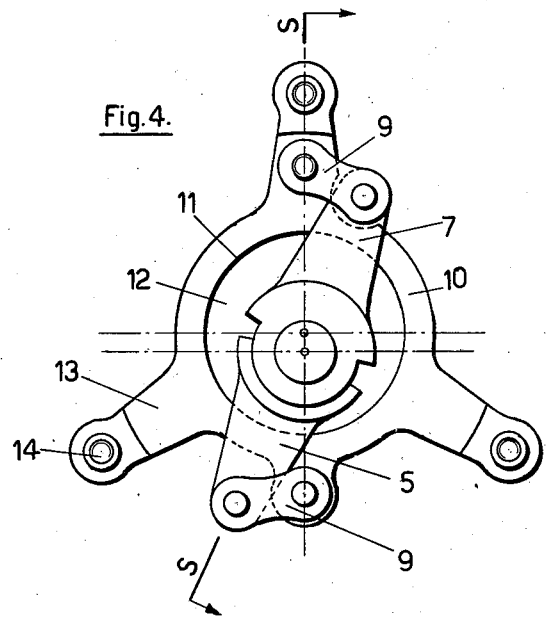

In the construction according to Figs. 3 and 4, showing the crank gear of Figs. 2a to 2b as applied to a cycle drive, 1 generally indicates a crank shaft one end of which is received in the bearing 2 of a gear casing 3. Fixed to or forming parts of the said shaft are a crank arm 4 and a lever 5. The shaft 1 is internally drilled longitudinally from one end to a predetermined point for rotatably bearing a second crank shaft 6 which is coaxial with the first shaft and upon which are rigidly secured or formed a lever 7 and a crank arm 8, the latter being normally set 180° with the crank arm 4.

The levers 5 and 7 are articulated by means of links 9 with a driving organ 10 which is eccentrically arranged with respect to the axis of the crank shafts 1 and 6. In the example shown, the said organ is rotatably supported on an outer eccentric bearing surface 11 provided by a boss 12 fixed to the gear casing 3, and it is formed with radial members 13 terminating in eyes 14 by means of which it may be suitably attached to the chain wheel, not shown, of a cycle. The driving organ might also be made a part of the chain wheel but, for convenience of manufacture, is preferably made separate therefrom. The boss 12 is herein shown providing at the same time a bearing for the other end of the crank shaft 1. The eccentricity of the outer bearing surface 11 of said boss has, in the present instance, a predetermined value; yet if desired, it may be adjustable by any convenient means not shown. To the outer ends of the crank arms 4 and 8 may be pivoted the pedals of the cycle not represented in the drawings.

The operation of this crank gear is the following: By moving the pedals up and down as may be the case on an ordinary cycle, the crank arms 4 and 8 are rotated together with their shafts 1 and 6 about the axis thereof, and such rotation is transmitted by the levers 5 and 7 and the links 9 upon the eccentric driving organ 10. As clearly shown in Figs. 1a to 1c and 2a to 2c, each complete revolution of said organ causes the crank arms 4 and 8 to undergo a relative angular displacement with respect to each other, the rising or driven arm 4 being turned quicker than the descending or driving arm 8 so as to lead the inverted position of the same by a certain angle which depends upon the eccentricity of the organ 10. When, on the one hand, the rising arm coincides with the vertical plane intersecting the axis of shafts 1 and 6, the descending arm has not yet reached said plane and is therefore still in driving relation while, on the other hand, upon coinciding of the descending arm with said plane, the rising arm has already been advanced over said angle into the driving position. Owing to this alternate overriding or leading of the effective driving actions of the arms 4 and 8 the crank is automatically moved past its dead-center positions without interrupting the production of torques. The latter are effective throughout the entire crank path and, consequently, transmission of power is rendered more uniform, and the efficiency of the crank gear is greatly increased.

In the construction according to Figs. 5 to 8, showing the crank gear of Figs. 2a to 2b as applied to a double-throw piston engine, 20 indicates an internally drilled crank shaft rotatable in bearings 21 and 22 formed in the machine casing 23. Within the shaft 20 is rotatably supported one end of a second crank shaft 24 which is coaxial with said first shaft and having its other end received in a bearing 25 of the machine casing. The shaft 20 carries a crank 26 and a lever 27 fast therewith, and the shaft 24 is shown formed with a crank 28 which is normally placed at 180° with the crank 26. Lever 27 and crank 28 are each articulated by means of a link 29 to a toothed wheel 30 arranged eccentrically with respect to the axis of rotation of the shafts 20 and 24 and freely revoluble about the said axis. In the present instance, said wheel is rotatably supported on an outer eccentric bearing surface 31 of the bearing body 22 and it engages with a gear wheel 33 fixed to a transmission driving shaft 32.

The further construction and the mode of operation of this engine drive is clearly shown in Figs. 7 and 8. To each of the cranks 26 and 28 is articulated a connecting or driving rod 34 acted upon by a piston 36 reciprocating in a cylinder 35 of the engine. In the example shown, the pistons 36 are leading or lagging each other by 180° in the cycle of action, and their reciprocating movement is imparted by the said connecting rods upon the cranks 26, 28 which, by reason of their mounting on different crank shafts, are rockable against each other about the axis of said shafts. From the cranks rotation is transmitted by the intermediary of the links 29 upon the toothed wheel 30 which drives the gear wheel 33 on the transmission shaft 32.

Owing to the eccentric mounting of the wheel 30 with respect to the crank shafts, the cranks 26 and 28 will alternately lead the aligned position in which they are normally coinciding and change over from an inoperative to an operative state without having to overcome dead centers. Accordingly, also the pistons 36 will overtake each other in the cycle of action; when the driving piston, i. e. the piston shown on the right of Fig. 8, reaches the outer end position wherein it reverses from the operative to an inoperative state, the other or driven piston shown on the left of said figure has already left the inner end position and retaken its operative stroke. It will be appreciated, therefore, that the operative stroke of each of the pistons shown always commences before the end of the operative stroke of the other or complementary piston.

Figs. 9 and 10 show a four-throw piston engine embodying a crank gear according to Figs. 1a to 1c. The said gear comprises again two coaxial crank shafts 40 and 41 rotatably mounted one within the other. The outer or hollow shaft 40 has fast thereto a crank 42 and a lever 44, and the inner shaft 41 is shown formed with a crank 43 and a lever 45. The free end of each of said levers carries a pin 46 and 47, respectively, which are slidable in slots 48 and 49 provided in a toothed wheel 50 which is eccentrically disposed and freely revoluble about the crank shafts. The cranks are normally placed at 180° and each of them is jointed to a pair of piston rods 52, 52' and 53, 53', respectively. Also in this engine drive it will be seen that, owing to the eccentric mounting of the driving wheel 50, the pistons acting upon different cranks will alternately overtake each other in the cycle of action, thereby ensuring a perfect uniform running of the engine at an increased efficiency.

The improved crank gears represented in Figs. 5 to 10 may be substituted for the intermittent or jerky drives hitherto employed on piston engines and the like. Moreover, the crank gears according to the invention are particularly adapted for use in continuous acting gear drives producing variable speeds by means of an adjustable fluid volume. The piston engine is then intended to operate as hydraulic motor for driving by means of the cranks shown, a revoluble organ which is eccentrically disposed with respect to the axis of the crank gear and adapted to impart uniform rotation at variable speeds to a machine tool or the like.

From the foregoing, it is believed that the construction and advantages of the present invention may be readily understood by those skilled in the art without further description, it being borne in mind that numerous changes may be made in the details disclosed without departing from the spirit of the invention. It will be seen, in particular, that the independent mounting of the cranks for relative rocking movement, as well as the jointed connection between said cranks and the eccentric driving organ may be realized in other ways different from the examples shown. Moreover, there might be provided more than two coaxial crank shafts for rotating about an axis common to all them, and each shaft might be formed with several cranks placed at suitable angles from each other.

I claim:

1. In a dead-centerless crank gear, the combination of at least two separate coaxial cranks normally placed at 180° for alternately taking up a driving and a driven position upon rotation about the axis of the crank gear, said cranks being mounted for relative rocking movement about the said axis so as to be capable of turning at different speeds with respect to each other in the operative direction of rotation, and a rotatable driving organ eccentrically disposed with respect to the axis of the crank gear, said organ having an articulated driving connection with each of said cranks and being operative to alternately turn the inoperative crank past one dead-center position into a driving position before in the other dead-center position the operative crank changes from the driving state into the driven state.

2. In a dead-centerless crank gear, the combination of two or more coaxial crank shafts mounted one within the other and carrying each a crank normally set 180° with the crank of another of said shafts for alternately taking up with the same a driving and a driven position upon rotation about the axis of said shafts, a rotatable driving organ eccentrically disposed with respect to the said axis, and an articulated driving connection between said organ and the cranks, whereby rotation of said organ alternately causes opposite cranks on different shafts to travel with different speeds thus enabling each operative crank to always lead the inverted position of the operative crank and to change over from its respective dead-center position into a driving state before in the opposite dead-center position the operative crank changes from the driving state into a driven state.

3. In a dead-centerless crank gear for piston engines, the combination with at least two reciprocable pistons normally leading or lagging each other by 180° in the cycle of action for alternately taking up an operative and an inoperative stroke and being each pivoted to one end of a piston rod, of an internally drilled first crank shaft formed with a crank connected to the free end of one of said piston rods, a second shaft coaxial with and rotatably supported by said first shaft and formed with a crank connected to the free end of the other of said piston rods, and a rotatable driving organ eccentrically disposed with respect to the axis of said shafts, said organ having an articulated driving connection with each of said cranks and being operative to alternately advance the crank connected to the inoperative piston past one dead-center position before the other crank connected to the operative piston reaches the opposite dead-center position so that the operative stroke of each of the pistons always commences before the end of the operative stroke of the other or complementary piston.

4. A dead-centerless crank gear according to claim 1 wherein pin and slot connections are respectively provided in said articulated connections between said driving organ and cranks.

5. A dead-centerless crank gear according to claim 2 wherein pin and slot connections are respectively provided in said articulated connections between said driving organ and cranks.

6. A dead-centerless crank gear according to claim 3 wherein pin and slot connections are respectively provided in said articulated connections between said driving organ and cranks.

7. A dead-centerless crank gear according to claim 1, wherein each crank has pivoted thereto one end of a link, the other end of each of said links being pivoted to the driving organ for establishing the articulated driving connection.

8. A dead-centerless crank gear according to claim 2, wherein each crank has pivoted thereto one end of a link, the other end of each of said links being pivoted to the driving organ for establishing the articulated driving connection.

9. A dead-centerless crank gear according to claim 3, wherein each crank has pivoted thereto one end of a link, the other end of each of said links being pivoted to the driving organ for establishing the articulated driving connection.

GEORGES MARQUET.